Dec. 31, 1946.  E. A. ANDERSON  2,413,424
LUMBER GRAIN SLOPE-MEASURING INSTRUMENT
Filed Sept. 4, 1945
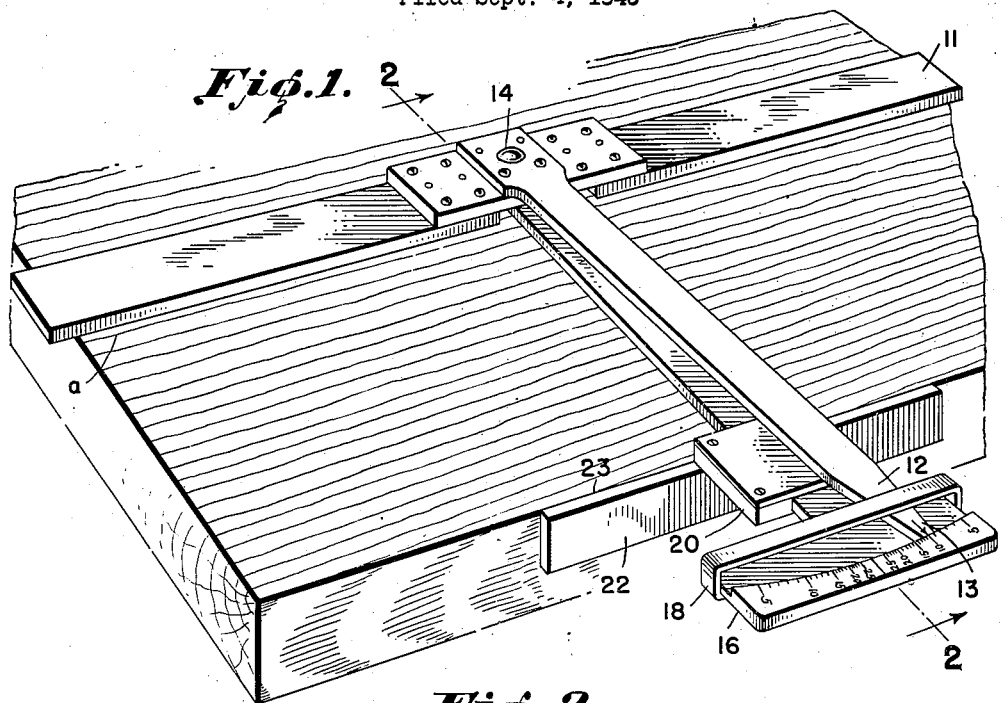
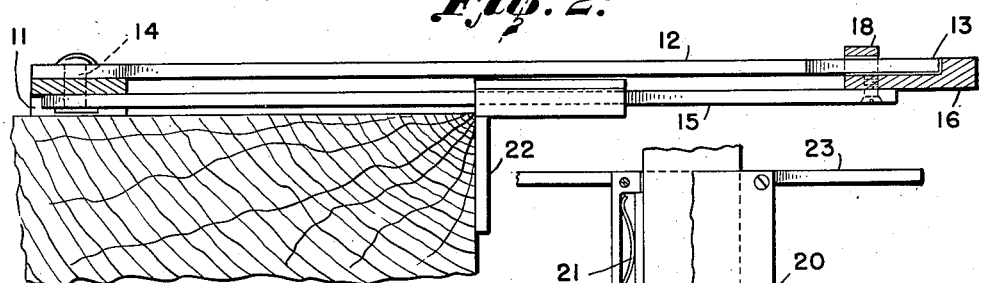
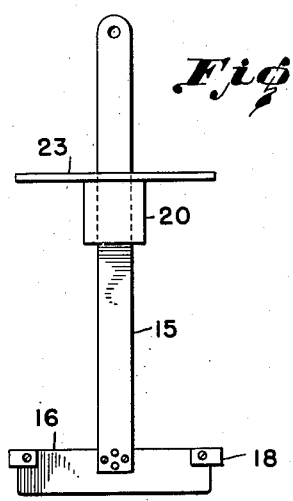
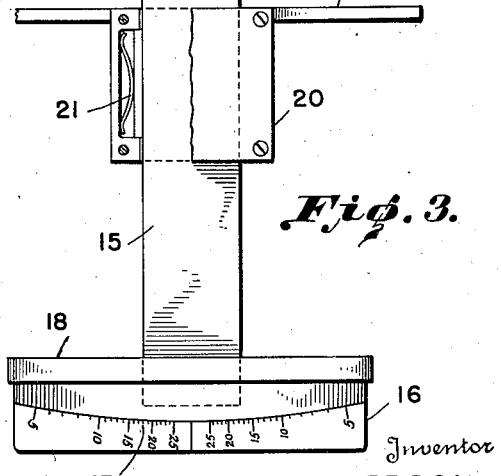
Inventor
ERIC A. ANDERSON Patented Dec. 31, 1946

2,413,424

UNITED STATES PATENT OFFICE 2,413,424

LUMBER GRAIN SLOPE-MEASURING INSTRUMENT

Eric A. Anderson, New Orleans, La., dedicated to to the free use of the people in the territory of the United States Application September 4, 1945, Serial No. 614,343

1 Claim. (Cl. 33—94)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to measuring instruments, and in particular to an instrument for measuring the slopes of grains on the surfaces of boards.

In grading and inspecting lumber, it is frequently desirable to determine the slope of grain, that is, the amount the grain deviates from parallelism with the edge of a board. The purpose of this invention is to provide an instrument which is simple and easily handled, which is readily set to determine the slope for any particular grain at any particular location of the board, and which directly gives a reading of the slope.

For a detailed description of the invention, reference is made to the accompanying drawing, in which Figure 1 is a three-dimensional view of the instrument showing it in position in operative adjustment to measure the slope of a particular grain at a particular point on a board;

Figure 2 is a section taken on the line 2—2 of Figure 1;

Figure 3 is a plan view of a detail with parts broken away; and

Figure 4 is a plan view of the detail corresponding to Figure 3 but showing the opposite side.

A rigid straight-edge bar 11 has rigidly attached thereto an indicator arm 12 preferably extending at right angles to the straight-edge bar. The indicator arm is provided with a pointer 13 at its free end. The straight-edge bar and indicator arm are pivotally mounted as at 14 on a scale bar 15, the latter bar carrying a dial 16 on which is arranged a graduated scale 17 in position to be traversed by the pointer 13 when the straight-edge bar and indicator arm are moved on their pivotal mounting. In the arrangement as shown, the scale bar 15 is positioned under the indicator arm and an inverted U-shaped guide 18 is attached to the dial with the bight of the U positioned over the end of the indicator arm to produce a sturdy construction.

A slide 20 is slidably mounted on the scale bar 15 and is provided with a spring 21 to hold the slide in true angular position relative to the scale bar, this construction being similar to that employed in mounting a cursor on an ordinary slide rule. The slide 20 carries a downwardly extending member 22 having a flat face 23 to engage the edge of the board. Member 22 is preferably mounted so that the flat face is perpendicular to the scale bar 15.

In use, the instrument is placed on a board, as shown in Figure 1, with flat face 23 engaging the edge of the board. The scale bar 15 is adjusted in the slide 20 and the straight-edge bar and indicator arm are pivoted on their mounting to bring the straight edge of bar 11 into coincidence with a selected grain, such as grain a of Figure 1, the slope of which is to be determined. The reading of the pointer on the scale is then a factor determining the slope of the grain relative to the degree of the board at that particular location.

In th structure shown, bar 11 is rectangular in plan, and either edge may be used as the straight edge.

Scale 17 may be calibrated in any manner desired. However, since the slope is conventionally measured in the number of inches longitudinal of the board per inch of rise of the grain (that is, the cotangent of the angle which the grain makes with the edge of the board), it is convenient to calibrate the scale to give this reading directly. That is, with the straight edge of bar 11 parallel to the flat face 23, the grain would extend parallel to the edge of the board, giving an infiniate number for the scale point matching the pointer at this location. The center mark of the scale in Figure 3 indicates this position. At each side of the center mark, the indices indicate the number of longitudinal inches per inch of rise of the grain. Indices up to 5 generally give a sufficient capacity for determining the slope of any grain of lumber with which the instrument is ordinarily used.

Having thus described the invention, what is claimed is:

An instrument for measuring the slope of grain in lumber comprising a straight-edge bar, an indicator arm rigidly attached to the straight-edge bar and provided with a pointer, a scale bar carrying a dial on which is arranged a graduated scale, the straight-edge bar and indicator arm being pivotally mounted on the scale bar with the graduated scale in position to be traversed by the pointer when the straight-edge bar and indicator arm are moved on their pivotal mounting, and a slide slidably mounted on the scale bar and carrying a member having a flat face to engage the edge of a board, whereby the instrument may be placed on a board with the flat face in engagement with the edge of the board and with the straight edge of the straight-edge bar coincident with a grain of the board and the slope of the grain to be read on the scale.

ERIC A. ANDERSON.